June 27, 1950 W. TODD 2,512,699
RADIO PULSE RECEIVER INTERFERENCE ELIMINATOR
Filed Dec. 6, 1945
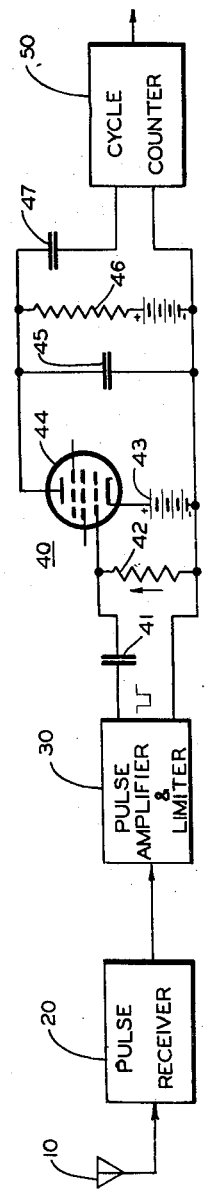
INVENTOR.
WILLIAM TODD
BY
William D. Hall.
ATTORNEY

Patented June 27, 1950

2,512,699

UNITED STATES PATENT OFFICE 2,512,699

RADIO PULSE RECEIVER INTERFERENCE ELIMINATOR

William Todd, Neptune City, N. J., assignor to the United States of America as represented by the Secretary of War Application December 6, 1945, Serial No. 633,255

3 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

My invention relates generally to interference reducing means for radio pulse signaling systems. In particular it relates to means for reducing or eliminating the response to short duration noise or radar pulses in a system for handling wider pulses.

In certain types of radiosonde systems, information is transmitted by frequency modulating or amplitude modulating the output of a radio transmitter by means of pulses having a repetition rate which varies from about 10 to 200 per second, and a duration of the order of 100–200 microseconds. At the receiver, the repetition rate is measured by means of a cycle counter. Since the latter can respond to shorter duration pulses, spurious indications are obtained when noise is present or when the equipment is used in the vicinity of radar stations or the like.

It is a principal object of my invention to devise a receiver circuit which will discriminate in favor of the longer duration pulses, thereby reducing the difficulties above mentioned.

For a better understanding of the invention, together with other and further objects thereof, reference is had to the following description taken in connection with the single figure of the accompanying drawing, which shows a schematic circuit diagram of the invention.

The drawing shows a preferred embodiment of my invention incorporated in a pulse receiving system, including an antenna 10 connected to a conventional pulse receiver 20. The output of the receiver detector may be amplified and limited at 30 to provide rectangular, negative-going pulses of uniform amplitude. These pulses are changed to sawtooth waves by means of a sawtooth wave generator 40, the output of which is translated by a cycle-counting circuit 50 which, in turn, operates an indicator or recorder (not shown).

In accordance with my invention, the sawtooth wave generator is made unresponsive to pulses having less than the desired duration. Generator 40 comprises a pentode tube 44 having in its plate circuit a resistor 46 shunted by a condenser 45. A battery 43 biases the grid negatively so that the tube is normally at plate current cutoff.

The pulse output of limiter 30 is applied to a circuit including a resistor 42 connected in series with a condenser 41. The pulse voltage across resistor 42 is applied in series with battery 43 between the grid and cathode of tube 44.

When tube 44 is at plate current cutoff, condenser 45 is charged through resistor 46. When tube 44 is rendered conducting, condenser 45 discharges suddenly through the low impedance plate-cathode path of the tube. This action results in the generation of sawtooth waves which are applied to cycle counter 50 through a blocking condenser 47.

Tube 40 is rendered conducting as follows: At the start of each negative-going pulse from limiter 30, condenser 41 charges through resistor 42 in the direction indicated by the arrow. In this direction the charging current causes a potential to be developed across resistor 42 which renders the grid of tube 44 to become more negative, so that the tube remains at cutoff.

At the end of each pulse, condenser 41 discharges in the opposite direction, so that the voltage developed across resistor 42 opposes the blocking voltage of battery 43. If this opposing voltage is of sufficient amplitude, the tube is rendered conducting.

In accordance with my invention, only pulses longer than a predetermined duration can cause sufficient unblocking voltage to be developed across resistor 42. For this purpose, the time constant of resistance-capacitance network 41—42 is made sufficiently long to permit the condenser 41 to charge to a voltage high enough to cause unblocking only when the charging period of condenser 41 is at least of the desired duration. For pulses of shorter duration the charging time is insufficient to permit condenser 41 to charge to a potential which will unblock the tube. As a result, the circuit will not respond to said pulses of shorter duration.

In one particular design, the condenser 41 was 100 mmf., and the effective resistance of the condenser charging circuit, which includes resistance 42 and the plate-cathode impedance of the preceding limiter tube, was about 650,000 ohms. The voltage required to be developed across resistor 42 to overcome the blocking bias of battery 43 was about 15 volts.

The above-described circuit also inherently acts as a phase inverter, thereby eliminating the need for an additional tube which performs this function in certain circuit applications.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:
1. In a radio pulse system, a receiver, means in said receiver for deriving, from incoming pulse-modulated signals, pulses of constant amplitude, a normally-blocked sawtooth wave generator adapted to be keyed by said pulses, said generator comprising an electron tube having at least a plate, grid, and cathode and having a blocking bias in the grid circuit thereof, and means in said grid circuit responsive only to pulses above a predetermined duration to unblock said tube, said last-named means comprising a condenser in series with a resistor, the time constant of which is such that only pulses having at least said predetermined duration will charge said condenser to sufficient voltage to overcome said blocking bias, an integrating circuit in the plate circuit of said tube for deriving a discrete saw tooth wave for each of the unblocking pulses, and means responsive to the output of said integrating circuit for measuring the repetition rate of said saw tooth waves.

2. In a radio pulse system, a receiver, means in said receiver for deriving, from incoming pulse-modulated signals, pulses of constant amplitude, a normally-blocked sawtooth wave generator adapted to be keyed by said pulses, said generator comprising an electron tube having at least a plate, grid, and cathode and having a blocking bias in the grid circuit thereof, and means in said grid circuit responsive only to all pulses above a predetermined duration to unblock said tube, said last-named means comprising a condenser in series with a resistor upon which said pulses are impressed, said resistor being in series with said blocking bias, said condenser being charged at the start of each pulse and discharged at the end of each pulse, the direction of said discharge being such as to overcome said blocking bias, the time constant of said condenser and resistor circuit being such that only pulses having at least said predetermined duration will charge said condenser to sufficient voltage to overcome said blocking bias upon the discharge thereof, an integrating circuit connected between said plate and cathode comprising a condenser connected in parallel with a resistor, the time constant of which is such that a discrete saw tooth wave is generated in the plate circuit of said tube for each of the unblocking pulses applied to said grid circuit, and a cycle counter connected across said integrating circuit to measure the repetition rate of said saw tooth waves.

3. In a pulse translating system, means for limiting the amplitude of incoming pulses, a normally-blocked sawtooth wave generator adapted to be keyed by the output of said limiter, said generator comprising a grid-controlled electron tube having a blocking bias in the grid circuit thereof, and means in said grid circuit responsive only to pulses in said output above a predetermined duration to unblock said tube, said last-named means comprising a condenser in series with a resistor upon which said pulses are impressed, said resistor being in series with said blocking bias, said condenser being charged at the start of each pulse and discharged at the end of each pulse, the direction of said discharge being such as to overcome said blocking bias, the time constant of said condenser and resistor circuit being such that only pulses having at least said predetermined duration will charge said condenser to sufficient voltage to overcome said blocking bias upon the discharge of said condenser, an integrating circuit in the plate circuit of said tube for deriving a discrete saw tooth wave for each of the unblocking pulses, and means responsive to the output of said integrating circuit for measuring the repetition rate of said saw tooth waves.

WILLIAM TODD.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,265,825 | Urtel et al. | Dec. 9, 1941 |
| 2,275,930 | Torcheux | Mar. 10, 1942 |
| 2,284,337 | Mubert | May 26, 1942 |
| 2,287,926 | Zepler | June 30, 1942 |
| 2,308,375 | Longhren | Jan. 12, 1943 |
| 2,431,037 | Grundmann | Nov. 18, 1947 |
| 2,440,278 | Labin et al. | Apr. 27, 1948 |

FOREIGN PATENTS

| Number | Country | Date |
|---|---|---|
| 491,728 | Great Britain | Sept. 8, 1938 |